United States Patent
Barker

(10) Patent No.: US 7,096,895 B2
(45) Date of Patent: Aug. 29, 2006

(54) METHOD AND APPARATUS FOR DISPENSING MOTOR VEHICLE FUEL AT UNATTENDED LOCATIONS

(76) Inventor: R. Keth Barker, 212 N. Isundega St., Westminster, SC (US) 29693

( * ) Notice: Subject to any disclaimer, the term of this patent is extended or adjusted under 35 U.S.C. 154(b) by 127 days.

(21) Appl. No.: 10/810,954

(22) Filed: Mar. 26, 2004

(65) Prior Publication Data

US 2004/0187951 A1  Sep. 30, 2004

Related U.S. Application Data

(60) Provisional application No. 60/458,158, filed on Mar. 27, 2003.

(51) Int. Cl.
*B65B 1/04* (2006.01)

(52) U.S. Cl. .......................... 141/94; 700/244
(58) Field of Classification Search ................. 141/94, 141/95, 192, 198, 311 A, 86; 700/244; 137/312
See application file for complete search history.

(56) References Cited

U.S. PATENT DOCUMENTS

| | | | |
|---|---|---|---|
| 4,901,748 A | 2/1990 | Shotmeyer | |
| 5,343,906 A | 9/1994 | Tibbals, III | |
| 5,596,501 A * | 1/1997 | Comer et al. ................ 705/413 |
| 5,608,154 A | 3/1997 | Kato et al. | |
| 5,634,503 A | 6/1997 | Musil et al. | |
| 5,851,108 A | 12/1998 | Clymer et al. | |
| 5,890,520 A | 4/1999 | Johnson, Jr. | |
| 5,992,395 A | 11/1999 | Hartsell, Jr. et al. | |
| 6,216,790 B1 * | 4/2001 | Webb .......................... 169/45 |
| 6,222,458 B1 | 4/2001 | Harris | |
| 6,237,647 B1 | 5/2001 | Pong et al. | |
| 6,321,984 B1 * | 11/2001 | McCall et al. .............. 235/381 |
| 6,363,299 B1 * | 3/2002 | Hartsell, Jr. ................ 700/244 |
| 6,575,206 B1 * | 6/2003 | Struthers et al. ............. 141/94 |
| 6,681,814 B1 * | 1/2004 | Bartlett et al. ................ 141/94 |
| 6,801,835 B1 * | 10/2004 | Covington et al. ......... 700/283 |
| 6,991,160 B1 * | 1/2006 | Demere ...................... 235/384 |

OTHER PUBLICATIONS

GASBOY FleetKey Fuel Management System, SL-FleetKey Fleet Key Series, Apr. 2001, www.gasboy.com, Gasboy International LLC of Lansdale, PA, USA.

Minerva S860 Combined Ultra-Violet Infra-Red Flame Detection, www.meggittavi.com, Vibro-Meter, Inc., formerly known as Meggitt Avionics of Manchester, NH,USA, no date.

Speedpass Questions & Answers, www.speedpass.com, Tulsa, OK, USA, no date.

* cited by examiner

*Primary Examiner*—Steven O. Douglas
(74) *Attorney, Agent, or Firm*—McNair Law Firm, P.A.

(57) ABSTRACT

An unattended gas station is disclosed having lockable pumps usable by a control group of purchasers who are provided with unlocking keys or cards, said pumps having flame and heat detectors and fire suppressants associated therewith and being monitored from a remote location by a security company through cameras and the detectors who can activate said fire suppressants and contact necessary fire, medical, and law enforcement personnel if needed.

10 Claims, 3 Drawing Sheets

METHOD AND APPARATUS FOR DISPENSING MOTOR VEHICLE FUEL AT UNATTENDED LOCATIONS

CROSS REFERENCE TO RELATED APPLICATION

This application claims priority from Provisional Application Ser. No. 60/458,158 filed Mar. 27, 2003.

FIELD OF THE INVENTION

This invention relates generally to motor vehicle refueling stations that are self-service and, more particularly, to such stations which are unattended and have no attendance on site.

BACKGROUND

Throughout the world and particularly in North America the number of motor vehicles increases significantly each year so that the consumption of motor vehicle fuel is continuously rising. Consequently, the need for more outlets for dispensing motor vehicle fuel also increases. However, the outlets or gas stations tend to be concentrated in populated, high traffic, areas and sometimes are not easy to access in such areas because of the position of the station's driveway entrance located on one-way streets, and difficulties in exiting from higher speed highways.

One way of providing more gas stations has been to switch to self-service stations that are most often associated with convenience stores. The convenience store attendant or checkout person has to continuously watch the pumps while attending to the cash register. Because of the risk of armed robbery and because of inconvenient hours, it is difficult to get qualified people to work at such stations. Accordingly, it is one object of the present invention to provide unattended gasoline refueling stations at supermarket parking lots, shopping centers, interstate rest stops, and other locations where space limitation would not permit a conventional filling station or convenience store.

In the past, even though payment for gasoline has been available by credit card or direct insertion of cash at a gas pump so equipped; development of a completely unattended station has been limited because of local fire codes and fear of vandalism. For example, according to Section 30A the "Motor Fuel Dispensing Facilities and Repair Garage Code" of the Natural Fire Protection Association (NFPA) of Quincy, Mass., one exception to the "no unattended station" rule is to only allow refueling at unattended locations where the vehicle and the gas pumps "are under common control or ownership." This allows a charter bus at a garage owned by the bus company to be refueled from an unattended pump, for example. In a later NFPA revision, namely, review 9A in Section 30A NFPA has made design recommendations for unattended stations but has ultimately left the decision up to local fire marshals. Accordingly, it is another object of the present invention to provide a method for dispensing gasoline at unattended locations by minimizing the opportunities for vandalism and theft and to provide a method which would be in compliance with fire codes and are acceptable to fire departments in most vicinities.

Another exception to the no unattended station rule is where key and card lock dispensing devices are used. Thus, another object of the present invention is to provide a method and apparatus that will meet with both exceptions so that unattended pumps will be accepted in most localities and the public will have a means for safe unattended gasoline refueling protected by both fire detection technology and by the local fire protection company.

In the past, a number of detectors and devices have been developed to make it safer to dispense gasoline at self-service installations. For example, U.S. Pat. No. 6,237,647 B1 which issued to William Pung, et al. on May 29, 2001 discloses an automatic refueling station where an automobile is provided with an onboard database that communicates with the gas station when the automobile arrives so the station computer can compute all the data needed to refuel the automobile including opening the gas tank and dispensing the fuel. However, this system is totally computer driven and there is no human surveillance save that of the vehicle operator. It is, however, an object of the present invention not to remove human surveillance totally from dispensing of the fuel but to provide continuous surveillance from a remote location by trained personnel.

In U.S. Pat. No. 6,222,458 B1, which issued on Apr. 24, 2001 to Scott C. Harris a method is described for preventing a fire or explosion caused by a cellular phone used while pumping gasoline.

In U.S. Pat. No. 5,992,395 which issued on Nov. 30, 1999 to Hal Hartsell, Jr. et al. a vapor recovery system at a gas pump becomes operable if the vapor recovery system of the vehicle being refueled is not working or if the vehicle does not have one.

In U.S. Pat. No. 5,890,520 which issued to William S. Johnson, Jr. on Apr. 6, 1999 a method of detecting drive offs is described. Another safety device is described in U.S. Pat. No. 5,851,108 that issued to Mark Clymer on Dec. 22, 1998 and which discloses an impact sensor system for a gas pump.

In U.S. Pat. No. 5,634,503 that issued on Jun. 3, 1997 to David I. Musil, et al. a method of automatically positioning the refueling nozzle close to a vehicle at a gas station by moving the gas pump nozzle on a track overhead is disclosed. In addition, in U.S. Pat. No. 5,608,154, which issued on Mar. 4, 1997 to Nabuhide Kato a carbon monoxide detector is described. Further, in U.S. Pat. No. 5,343,906 which issued on Sep. 6, 1994 to Harry F. Tibbals a method of checking emissions from a vehicle while it is being refueled is disclosed and the sensors also check for carbon monoxide. In another patent, namely, U.S. Pat. No. 4,901,748 which issued on Feb. 20, 1990 to Albert Shotmeyer a filling station structure having an overhead canopy for covering a vehicle at a refueling station is disclosed which contains smoke detectors that automatically call the fire department in the event of fire or smoke.

In the foregoing patents some of the detectors and prior art devices for keeping dispensing of gasoline safer are disclosed, particularly, for self-service dispensing of gasoline. Accordingly, it is an object of the present invention to make use of prior art detection devices and surveillance cameras to provide a safe and acceptable method of dispensing gasoline at locations which are unattended. The achievement of these objects will be more fully understood with reference to the summary of the invention and detailed description that follow.

SUMMARY OF THE INVENTION

In one aspect, the present invention is a method that allows motor vehicle fuel to be dispensed at an unattended location comprising the steps of: placing at least one lockable pump that can be actuated upon payment at an unattended location, positioning a flame detector and surveillance camera at said location; and providing for remote surveillance of the pump. The invention may include the step of providing a control group of purchasers who have unlocking keys or coded cards for said pump. The invention further includes automatic cutoff of the pump should flames be detected at which point the surveillance person can determine the appropriate response.

In another aspect, the invention comprises the steps of locating a fuel dispensing station at a convenient location, said location being unattended and without any provision for an attendant to be at said location; providing fuel dispensing pumps and a security canopy thereover at said location, said canopy having at a minimum a flame detector and preferably having smoke, heat, fuel vapor, carbon monoxide, and impact detectors and security surveillance cameras that can survey the immediate vicinity around said station; and at a monitoring station for monitoring one or more unattended fuel dispensing stations, continuously monitoring said detectors positioned on the security canopy, said monitoring being performed by a trained attendant. A signal from the flame detector shuts down the gas pumps and sends a signal to the local fire department and trained attendant. The attendant can immediately survey the station premises, evaluate the situation and immediately contact prearranged police, detective and emergency medical services (EMS) services. The pumps provided in said method will not operate unless activated by a membership card or code plus a credit card or cash. Also, the pumps may be provided with LCD screens with prompts for actuating the pumps or for enrolling members.

In another aspect, the invention is an unattended fuel dispensing station comprising: at least one fuel pump for dispensing gasoline upon insertion of a credit card or cash and an approved membership card or code, a security canopy over said pump; detectors associated with said canopy for detecting flame and/or smoke, heat, hazardous vapors and fumes and impact; and also includes a speaker and fire retardant dispensers, a monitoring location remote from said station for receiving signals from said refueling station; direct connection means from said monitoring station to fire, police, and/or detective security agencies and emergency medical services; whereby upon receiving a signal from such station a trained attendant can survey the area, read the messages from the indicators, and determine what, if any, fire, security, or medical personnel should be dispatched to the station.

Still another aspect of the invention is a method comprising the steps of: contracting with an established security agency that has, in place, continuous monitoring by trained personnel and that has established contacts and agreements with local fire, security, and medical personnel and locating a station as described above at a convenient location, monitoring the signals received from said station, and determining which dispatched said location.

In yet another aspect the present invention includes establishing a control group of purchasers or users wherein to become a member of said group, a prospective member can enroll at the station where pumps are provided with an LCD screen programmed with prompts and entry keys or a separate enrollment stand can be used. To enroll, the prospective member would provide identification, address, credit information and vehicle identification. An unlocking card or key would be issued upon acceptance. The invention in a further aspect is an improvement in the method of dispensing gasoline from a self-service pump by providing such a pump at an unattended location where a flame detector provides for safe operation and where the premises are monitored by camera from a remote location.

From the foregoing it can be appreciated that requirements for fire codes will be met as flame detector, constant monetary, and a controlled group of purchasers will be using the unattended pump.

The invention is better understood by reference to the drawings and the detailed description, which follow.

DESCRIPTION OF THE DRAWINGS

The drawings, which are appended hereto and made a part of this disclosure, are for purposes of illustration and understanding and do not limit the scope of the invention. In the drawings.

DETAILED DESCRIPTION

Figure 1:
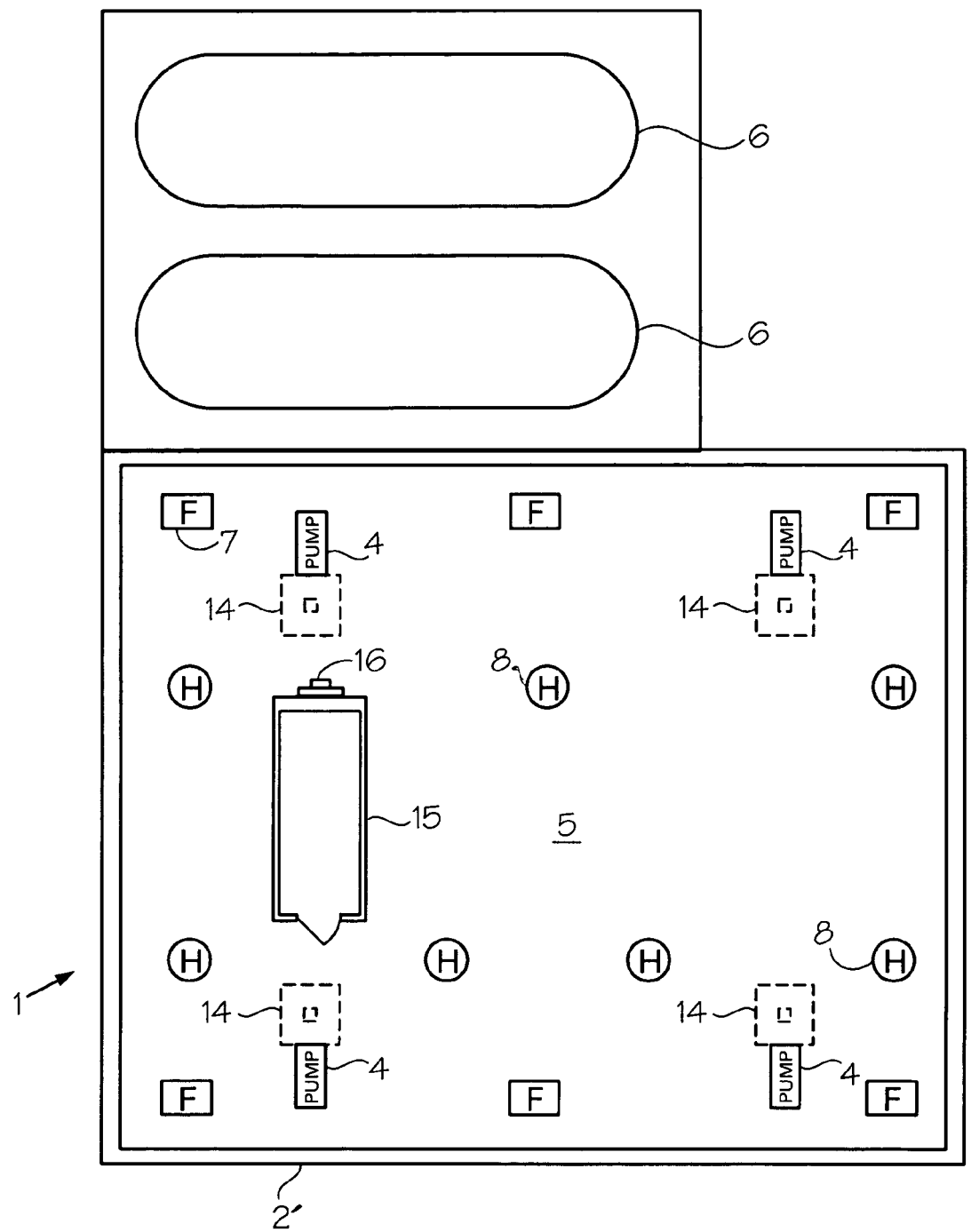
FIG. 1 is a schematic representation of top plan view of the layout of an unattended vehicle refueling station according to the present invention; and shows the location of the heat and flame detector on the canopy.

In recent years with the widespread and increasing popularity of sport utility vehicles, large pickup trucks, and vans, the consumption of gasoline has continued to increase. However, gasoline stations or vehicle refueling stations are not always conveniently located and may require that the vehicle operator drive a number of miles out of the way in order to fill up the vehicle. The present invention provides a very convenient way of making fuel more accessible to the vehicle operator by making it possible to put unattended pumps under a security canopy and locate these at shopping center parking lots, grocery store parking lots, subdivision entrances, and other locations, which are likely to be on the vehicle operator's normal routes.

In the past, placing unattended gas pumps in the aforementioned locations, for example, was not practical for fears of vandalism, theft, restrictive regulations, and potential hazards. However, the present invention provides a solution to these drawbacks and increases the convenience of dispensing gasoline by a surprisingly novel method that permits doing business by utilizing pumps under a security canopy at unattended locations. In further describing the invention the terms below will be understood to have the meanings set forth:

"Canopy" or "Security Canopy" is a rain shielding roof that is positioned either on columns or suspended above the gas pumps and is capable of carrying lights, detectors, cameras, sprinklers and fire retardant chemicals.

"Control," "Controlled," or "Purchasing" group means consumers who have obtained either mechanical keys, an electronically coded key, bar coded cards or magnetic strip cards or, in general, electronically, magnetically, or mechanically operated devices or means that will unlock and make a pump operable without further activation means or may also require a payment means for activation.

"Locking and unlocking means" includes standard, mechanical keys, programmable electronic smart keys of the type currently used for automobile ignitions or like purposes or the means can be a bar-coded card.

"Monitoring means" includes the surveillance cameras currently in use in banks, shopping centers, toll booths, office buildings, schools, and like places. Also included are two-way speakers or phones for audible commands and responses.

"Payment means" includes cash insertable into a receptacle therefor on a pump or credit card readers commonly in use. The locking means can include payment means.

"Remote" means a location not on the same premises as the gas pumps. At one large shopping center several stations can be positioned and surveillance carried out from a central location. Central location within a metropolitan area separated by a distance of miles or a location hundreds of miles from the pump is contemplated. The present invention eliminates the need for kiosk or booths at the station site which must be attended.

Suppressant chemicals for fire, particularly gasoline fire, include the sodium bicarbonate based nitrogen charged liquid which can be sprayed from nozzles located in said canopy. Sodium bicarbonate and other chemicals are well-known in the art for combating gasoline or hydrocarbon based fire.

Figure 3:
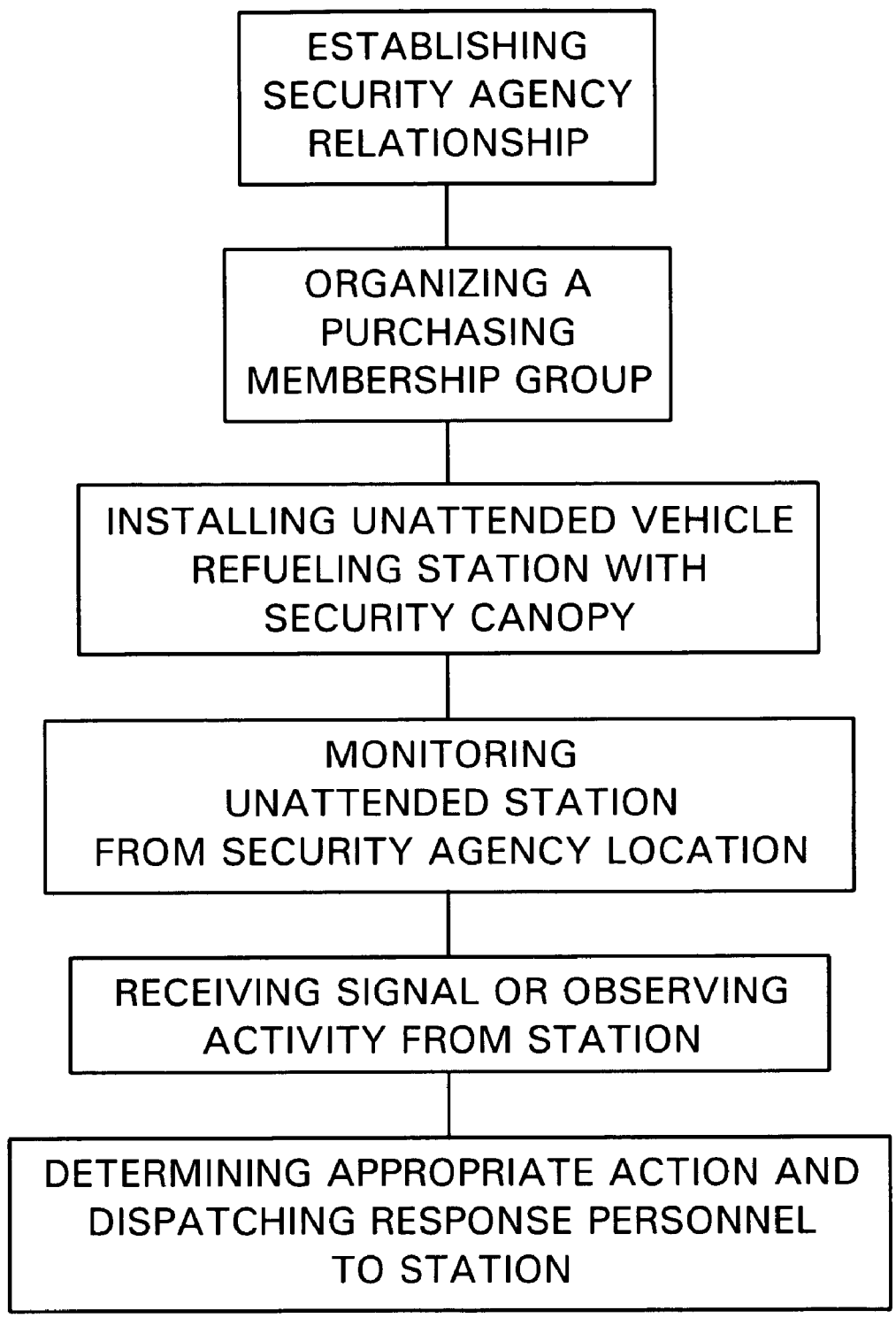
FIG. 3 is a block flow diagram showing the steps in a method according to one embodiment of the present invention.

Referring first to the block flow diagram set forth in FIG. 3, the process preferably begins with contacting and contracting with an established security agency that has developed a presence in the vicinity in which the refueling station is to be located. There are a number of such agencies with their services throughout the United States, which monitor alarm systems that are set up in office buildings, factories, warehouses, and residential homes. Among those nationally known companies, which provide such services, are ADT, American Services, Inc., and Security One, just to name a few. Preferably, a security system company, in addition to its twenty-four hour, seven day a week, on duty, trained monitoring personnel, will have on the road security guards available to make quick checks on locations and also will have immediate access to the fire, police, and emergency medical services (EMS) that provide service closest to the unattended locations of the refueling stations. As an alternative, a new remote location for surveillance can be established and personnel trained for it.

Figure 2:
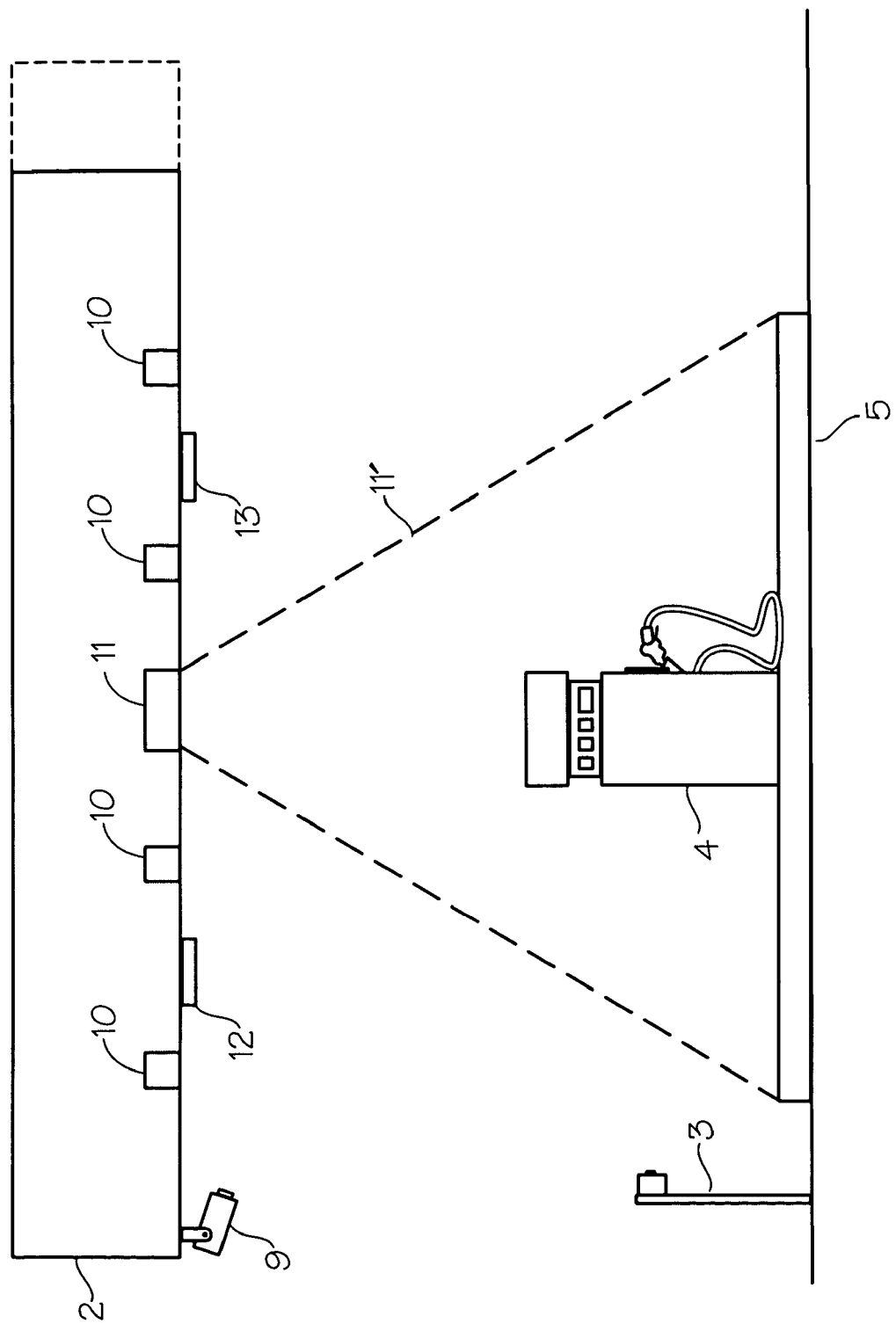
FIG. 2 is a side elevation view of one embodiment of the refueling station of the present invention showing the security canopy in place and showing a single pump installation.

In the preferred method of the present invention monitoring is done at the security service location of the unattended refueling station 1 which is shown in FIG. 1 in a preferred plan view in schematic overlay, i.e. the canopy overlay 2' is shown. Another embodiment of the station is shown in FIG. 2 in an elevational view where the station 1 is at least partially covered by security canopy 2. The security canopy has installed therein or associated therewith first a detector for flame and preferably additional detectors for heat, fire, smoke, and fuel vapor as well as carbon monoxide detectors, and impact detectors.

In FIG. 1 the layout or arrangement of the primary detectors, namely the flame and heat detectors, can be seen. Specifically, flame detectors (F) numbered as 7 may be suspended from the canopy and where they are above the vehicles and users or they may be at ground level. If flame is detected the pumps are shut down and alarm given to the fire department. Heat detectors (H) or 8 are similarly suspended from the canopy. A preferred flame detector is the Minerva S860 Detector, (See the Tyco website www.tycofire.com which incorporates a spectral analysis to detect all flames emitted from burning hydrocarbons.

In FIG. 2 detectors 10 are shown in canopy 2. These detectors 10 are carbon monoxide, smoke, vibration, and hydrocarbon vapor detectors. Anti-theft devices as are known in the art are included to detect pilfering and attempts to vandalize or rob the gasoline pumps. An emergency call box 3 is available at each pump so that a purchaser or customer or member at the gas pumps can make an emergency call to the monitoring station or to 911. This call box also allows the remote monitoring person to give verbal instruction to the user and is used in combination with speakers 12. On the canopy 2 fire extinguishing equipment 11, speakers 12, and alarm 13 are located. All of the foregoing detectors are available individually as described in the patents set forth above in the background portion of this disclosure. However, the unique combinations of these under a single security canopy are part of a preferred embodiment of the present invention.

Referring again to FIG. 1, a vehicle that enters on paved pad 5 and can refuel at any available pump 4. The overlay or outline 2' of pad 5 roughly conforms to the covered area provided by canopy 2 See FIG. 2). Storage tanks 6 which are buried are also shown in FIG. 2 as well as support and supply columns 14 that may carry supply lines 14. Also located on each column 14 are glass covered red fire alarms selected from any of those well-known in the art and blue alarms for contacting the police. An equipment room 15 for maintenance is shown as well as ATM location 16.

In addition, under the canopy at least one and preferably a series of rotatable cameras 9 are positioned with wide angle lenses in order to not only survey the area around the gas pump where a customer may be refueling but will also be able to survey the premises for any questionable activity.

In a preferred embodiment, the fueling station 1 as shown in FIGS. 1 and 2 will comprise a paved pad or platform 5 upon which the vehicles drive and pump 4 will be located so that the vehicle may be positioned in the conventional manner beside the pump. The pumps preferably are those commonly used in the United States in self-service operations which can be operated by the insertion of a credit card or into which dollar bills may be inserted for direct cash payment. Printed receipts will be available as is also well known. Particularly useful self-service pumps are those supplied by such manufacturers as Gasboy International LLC of Lansdale, Pa. whose FleetKey System can be incorporated in the present invention. The FleetKey system provides the user or member with a key that activates the pump in conjunction with a PIN or preferably with the member's credit card. This prevents non-members from using the pumps so that access is limited to a controlled group. With the inclusion of a flame detector the fire code requirements of many localities are met. As a feature of the invention a key, smart key, coded card, or bar coded card can be used to unlock the gas pumps. When the security canopy includes multiple detectors and cameras, monitoring can be readily performed at the security station thereby reducing risks and hazards.

As an alternative to using an established security service, a large operator of a number of unattended refueling stations can have its own monitoring location centrally located so that a plurality of stations can be readily monitored without having any attendants on the premises where stations are located.

In addition to the detectors mentioned above with the security canopy, fire-extinguishing equipment at location 11 (FIG. 2) is installed. The fire suppressing liquid such as nitrogen charged bicarbonate of soda type is emitted from nozzles upon signal from a flame detector and, preferably additional fire extinguishing equipment is located at a ground level based on the assumption that most gasoline fires occur because of gasoline spills. Preferably a sprinkler for water is also available in the canopy at location 11 but water would not be applied automatically. If gasoline were spilled, after a vehicle moved, the pump area could be washed down by direction from the remote operator.

Continuing with the preferred method of the present invention, when a signal is received by the monitoring agency or if the person at the monitoring station observes activity that deserves attention, depending upon the signal or the activity observed, the monitoring person can immediately contact the police, emergency medical services or fire department depending on the nature of the emergency and give instructions through the loud speaker 12 which is installed in the security canopy and direct the motor vehicle operators about what to do, namely, informing them that police, emergency services, or firemen are on the way. If theft or vandalism is detected, voice warning is available and through the recording cameras 9, photographs and video tape of the activities and people involved would be recorded plus an alarm would be set off. Activation and use of the foregoing equipment, alarms, and emergency personnel dispatch would be at the discretion of the operator. By contrast, in many present day self-service locations which are associated with a convenience store, the typical clerk would not be able to perform all of the determinations that could be done by the trained personnel at the remote location with all of the foregoing mentioned services available. On the other hand, the trained personnel at the monitoring station would perform the corrective steps needed by contacting and determining the appropriate response personnel to contact and have them dispatched to secure the station.

The membership, at each pump, will be advised by tutorial to be read from the pump's screen or as posted on the pump that a condition for using the pumps is agreement to the following:

Safe Refueling and Fuel Handling Guidelines for Members

Turn off your engine. Put your vehicle in park and/or set the emergency brake. Disable or turn off any auxiliary sources of ignition such as a camper of trailer heater, cooking units, or pilot lights.

Do not smoke, light match or lighters while refueling at the pump or when using gasoline anywhere else.

Use only the refueling latch provided on the gasoline dispenser nozzle. Never jam the refueling latch or nozzle open.

Do-not re-enter your vehicle during refueling. If you cannot avoid re-entering your vehicle, discharge any static build-up BEFORE reaching for the nozzle by touching something metal with a bare hand—such as the vehicle door—away from the nozzle.

In the unlikely event a static-caused fire occurs when refueling, leave the nozzle in the fill pipe and back away from the vehicle. Go to the glass covered emergency fire alarm and activate alarm.

Do not over-fill top off your vehicle tank, which can cause gasoline spillage.

Never allow children under licensed age to operate the pump.

Avoid prolonged breathing of gasoline vapors. Use gasoline only in open areas that get plenty of fresh air. Keep your face away from the nozzle.

Never siphon gasoline by month nor put gasoline in your month for any reason. Gasoline can be harmful or fatal if swallowed. If someone swallows gasoline, do not induce vomiting. Contact a doctor or and emergency medical service provider immediately.

Keep gasoline away from your eyes and skin; it may cause irritation. Remove gasoline-soaked clothing immediately.

Use gasoline as a motor fuel only.

Portable Containers

When dispensing gasoline into a container, use an approved portable container and place it on the ground to avoid a possible static electricity ignition of fuel vapors. Containers should never be filled while inside a vehicle or its trunk, the bed of a pickup trunk of the floor of a trailer.

When filling a portable container, manually control the nozzle valve throughout the filling process. Fill a portable container slowly to decrease the chance of static electricity buildup and minimize spilling or splattering. Keep nozzle in contact with the rim of the container opening while refueling.

Fill container no more than 95 percent full to allow for expansion.

Place cap tightly on the container after filling—do not use containers that do not seal properly.

Only store gasoline in approved containers as required by federal or state authorities. Never store gasoline in glass or any other unapproved container.

If gasoline spills on the container, make sure it has evaporated before you place the container back in your vehicle. Report spills through the facility operator assistant telephone. Real time audio and video monitoring will begin.

When transporting gasoline in a portable container make sure it is secured against tipping and sliding, and never leave it in direct sunlight or in the trunk of a car.

It is believed that the above described invention provides more safety than the typical convenience store where the attendant must perform the multiple tasks required and keep an eye on the pumps, too. It is understood that all connections, transmission lines and the like to connect and transmit signals and images are well-known in the art and are readily available and installed.

Once those skilled in the art have read my foregoing disclosure, many other embodiments and alternatives may occur to the reader. However, my invention is limited only by the scope of the claims, which follow:

I claim:

1. A method for dispensing motor vehicle fuel at an unattended location comprising the steps of:
   a) providing a location for a fuel dispensing station, said location being without any provision for an attendant to be present on the premises;
   b) providing a remote monitoring station with a trained attendant;
   c) establishing a purchasing membership group whose members will use the dispensing station for fueling their vehicles;
   d) installing and maintaining at least one fuel dispensing pump and storage and supply tank at said location;
   e) providing a surveillance camera that can survey the immediate vicinity around said location and transmit images to said remote station;
   f) providing flame detector means positioned to detect flame in the vicinity of said pump;
   g) providing means for dispensing fire suppressant chemicals to and around said pumps, the dispensing of said suppressant chemicals being activated by signal from said flame detector; and, providing smoke, fuel vapor, heat impact, and carbon monoxide detectors;
   h) providing said pumps with locking means and providing each member with unlocking means for said pump, said pumps being activated by employing a combination of said unlocking means and a payment means;

i) continuously monitoring the flame detector and camera at the unattended location by the trained attendant at the remote location who can immediately survey the station should a detector signal an alarm or should the attendant observe questionable activity, said trained attendant having an immediate, prearranged access to local fire, police, and emergency medical services; and, j) dispensing fuel into the vehicle of a member who has unlocked the pump and provided payment means.

2. The method of claim 1 including the step of providing a security canopy for said at least one pump, said canopy covering at least one vehicle that is being re-fueled, and wherein said detectors and cameras are located in said canopy.

3. The method of claim 1 including providing in said canopy fire suppressant chemicals for suppressing a gasoline fire.

4. A method for dispensing motor vehicle fuel at an unattended location comprising the steps of:
   a) providing a readily accessible location for a fuel dispensing station, said location being without any provision for an attendant to be at the location;
   b) establishing a purchasing group whose members are authorized to use the dispensing station for fueling their vehicles;
   c) providing fuel dispensing pumps with a security canopy positioned thereover, said canopy having smoke, heat, fuel vapor, carbon monoxide, smoke, and impact detectors, security surveillance wide angle cameras that can survey the immediate vicinity around said location installed thereupon;
   d) providing speakers for audibly contacting anyone within the area of the station;
   e) providing direct dispensing means for water or gasoline fire suppressant chemicals and materials;
   f) providing said pumps with locking means and providing each member with a key means or coded card means to unlock said pump;
   g) providing said pumps with payment means, said pumps being operable when unlocked and said payment means activated;
   h) providing a monitoring location remote (rum said fuel pump station;
   i) providing a trained attendant at said remote location who can immediately survey the station should one of the detectors signal an alarm or should the attendant observe questionable activity, said trained attendant having an immediate, prearranged access to local fire, police, and emergency medical services.

5. The method of claim 4 wherein step b) is performing by providing at the fuel pump programmed LCD screen with prompts for membership enrollment whereby a prospective member follows prompts to provide information and accept liability to become a member.

6. The station of claim 5 wherein said pump has associated therewith a programmed LCD screen for enrolling members.

7. A method of operating motor vehicle refueling stations at unattended locations comprising the steps of:
   a) contracting with a security agency having continuous surveillance of multiple locations and established contacts with police, fire, and emergency medical services, said security agency having personnel at the monitoring station at all times;
   b) installing a motor vehicle refueling station at an unattended location, said motor vehicle refueling station having a lockable dispensing pump actuated by payment means, and unlocking means;
   c) enrolling members to use said unattended station;
   d) positioning a canopy over said pumps having a flame detector, a surveillance camera and audio means for receiving and sending audible information to said station, said canopy being positioned to cover a vehicle being re-fueled; and
   e) providing fire extinguishing liquids and water dispenser in said canopy;
   f) monitoring conditions at said unattended location at the security agency;
   g) when signals received or questionable activity observed at the refueling station by the surveillance person at the monitoring station, determining the appropriate response needed for such signal or activity;
   h) contacting and dispatching the appropriate police, fire, or emergency medical service agency; or giving voice instructions to said station;
   i) taking corrective activity as required by voice commands, alarms, or by directing fire extinguishing liquids or water.

8. The method of claim 7 wherein step a) includes the step of establishing a security agency and not contracting with a security agency.

9. The method of claim 7 including heat detecting means associated with said canopy.

10. The method of claim 7 wherein the step of enrolling members includes providing means at the unattended station for providing identification and credit information for prospective membership.

* * * * *